United States Patent

[11] 3,621,938

| [72] | Inventor | Henry C. Beattie<br>Marine City, Mich. |
|---|---|---|
| [21] | Appl. No. | 813,858 |
| [22] | Filed | Apr. 7, 1969 |
| [45] | Patented | Nov. 23, 1971 |
| [73] | Assignee | Reef-Baker Corporation<br>Detroit, Mich. |

[54] LUBRICATING SYSTEM FOR VEHICLES
2 Claims, 4 Drawing Figs.

[52] U.S. Cl. ............................................. 184/7 CR,
137/234.6
[51] Int. Cl. ...................................................... F16n 7/14
[50] Field of Search............................................. 184/7, 7 C,
7 CR, 1.5; 137/234.6; 141/198

[56] References Cited
UNITED STATES PATENTS

| 1,280,829 | 10/1918 | Perley | 137/234.6 |
|---|---|---|---|
| 2,327,025 | 8/1943 | Davis | 184/7 |
| 2,363,754 | 11/1944 | Smith et al. | 184/7 X |
| 2,495,976 | 1/1950 | Lawrence | 184/7 |
| 2,521,615 | 9/1950 | Walker | 184/7 |
| 2,725,119 | 11/1955 | Edge et al. | 184/7 |
| 2,966,248 | 12/1960 | Armbruster | 141/198 X |
| 3,367,446 | 2/1968 | Higgins | 184/7 |
| 3,499,506 | 3/1970 | Durnan et al. | 184/7 |
| 1,818,464 | 8/1931 | Davis | 184/7 |
| 2,834,376 | 5/1958 | Hughes | 184/7 UX |

FOREIGN PATENTS

| 720,111 | 12/1954 | Great Britain | 184/7 CR |

*Primary Examiner*—Manuel A. Antonakas
*Attorney*—Whittemore, Hulbert & Belknap

ABSTRACT: The lubricating system includes a lubricating station or island having a reservoir for lubricant and a timer-operated pump to lubricate bearings and the like on vehicles such as buses and trucks. Each vehicle has a conduit system which may be connected to the pump and which leads to the points to be lubricated. A metering device is associated with each point to be lubricated to meter the desired amount of lubricant.

PATENTED NOV 23 1971

3,621,938

INVENTOR.
HENRY C. BEATTIE
BY
Shuttlemore, Hulbert & Belknap
ATTORNEYS 3,621,938

LUBRICATING SYSTEM FOR VEHICLES

SUMMARY OF THE INVENTION

It is an essential object of this invention to provide an improved lubricating system for vehicles.

Another object is to provide a vehicle-lubricating system having a lubricating station or island adapted to serve an entire fleet of trucks or buses.

Another object is to provide a lubricating system which is of simple construction and relatively inexpensive.

Another object is to provide a lubricating system having lubricant-pumping means at a lubricating station, each vehicle having conduit means leading to the point or points requiring lubrication, and means for metering the exact amount of lubricant delivered.

Another object is to provide a releasable coupling enabling the lubricant pump to be quickly connected to and disconnected from the conduit means on the vehicle.

Another object is to provide means for actuating and deactuating the pump at timed intervals to provide one or more surges of lubricating pressure in the system.

Another object is to provide a separate metering valve for each of the points to be lubricated.

Other objects and features of the invention will become apparent as the description proceeds, especially when taken in conjunction with the accompanying drawing, wherein.

Figure 1:
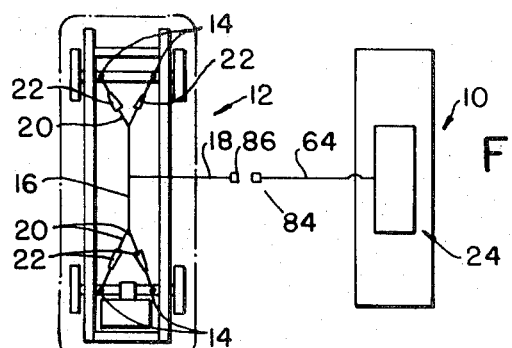
FIG. 1 is a diagrammatic view showing a vehicle such as a truck or a bus having points to be lubricated, adjacent to a lubricating station or island.

Referring now more particularly to the drawing, the lubricating station or island is shown in FIG. 1 and generally designated 10, and a vehicle such as a bus or truck having one or more points requiring lubrication is generally indicated at 12. The island may be either fixed or movable, as desired.

The vehicle has a number of points 14 requiring periodic lubrication, such as a camshaft or bearings, for example. The vehicle has a conduit system including the connecting hydraulic lines 16 and 18, and the branch lines 20 which lead from line 16 to the several points 14 requiring lubrication. There is a metering device 22 in each of the branch lines 20. Some points to be lubricated require more lubricant than others and accordingly the metering devices 22 are selected to meter the exact amount of lubricant needed.

Figure 2:
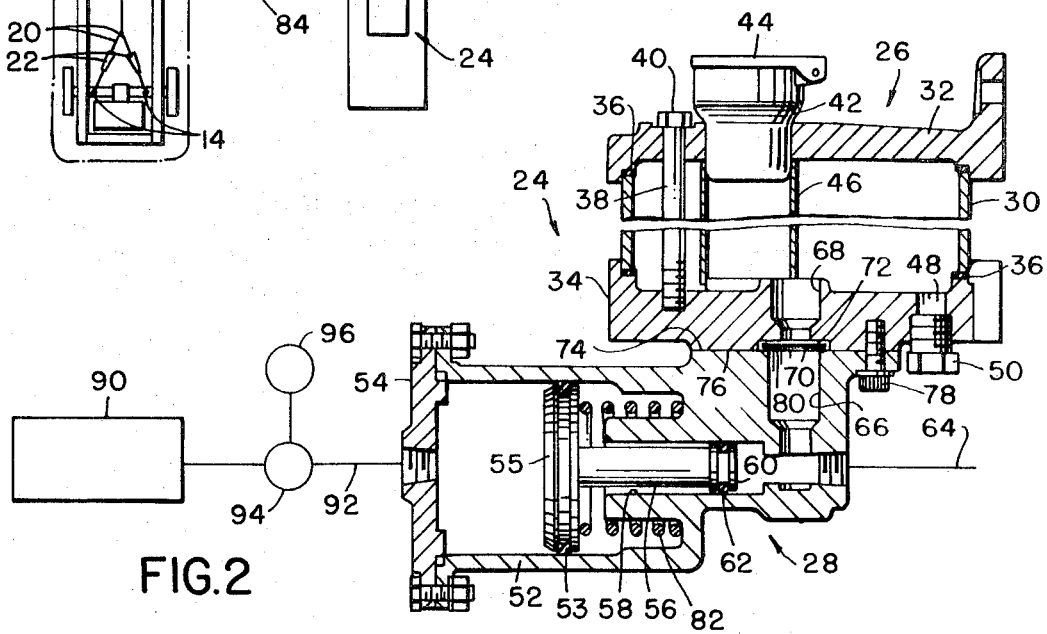
FIG. 2 is a sectional view of the lubricant pump and reservoir at the lubricating station.

The lubricating station or island 10 has a reservoir and pump assembly 24 which is more clearly illustrated in FIG. 2. The assembly 24 includes a reservoir 26 and a pump 28. The reservoir 26 is adapted to contain a supply of lubricant such as oil or grease and has a cylindrical body 30 closed at the ends by a cover 32 and a base 34. Sealing gaskets 36 seal the joints between the cylinder 26 and the cover 32 and base 34. The parts of the reservoir are held together by tie rods 38 which thread into the base 34 and are secured by nuts 40. Lubricant is admitted to the reservoir through an inlet 42 having a hinged cover 44. The tubular perforated member 46 is a filter screen for lubricant admitted to the reservoir. A drain opening 48 is normally closed by a threaded plug 50.

The pump 28 has a cylindrical pump body 52 which is closed at one end by a cover 54. A piston 55 is reciprocable within the cylindrical pump body and has an integral plunger 56 extending axially therefrom into a reduced passage 58 leading from the cylinder 52. The plunger has a pistonhead 60 on the end. The piston 55 is provided with an annular U-cup seal 53 engaging the walls of the cylinder 52, and the plunger head 60 has an O-ring seal 62 engaging the walls of the passage 58. The passage 58 connects with the outlet line 64. It also communicates by way of a passage 66 with passage 68 leading from the bottom of the reservoir. A valve plate 70 at the juncture of passages 66 and 68 controls the movement of lubricant from the reservoir to the pump. As shown, the lower surface of the reservoir base has an annular recess 72 overlying the top surface 74 of the pump body which is clamped to the bottom surface 76 of the reservoir base in the relationship shown by fasteners 78. The valve plate 70 is disposed in the recess 74 and is smaller in diameter than the recess. The valve plate 70 is thinner than the vertical dimension of the recess so that it is capable of floating up and down. When the pump piston 55 retracts, valve plate 70 is supported by an annular series of projections 80 on the pump body in a position such that lubricant may bypass the valve plate from the reservoir to the pump through passages 66 and 68. During a pumping stroke, the pressure in passage 66 forces the valve plate upwards into sealed engagement with the top of the recess 72 to block communication with the reservoir.

FIG. 2 shows the pump piston 55 at the end of a pumping stroke when air pressure is admitted to the cylinder 52 behind the piston. When the air pressure is relieved piston 55 will be moved or retracted by compression coil spring 82 to a position in substantial contact with the pump cover 54.

The line 64 leading from the pump extends to a coupling member 84, and it will be noted that the line 18 on the vehicle has a complementary coupling member 86. These coupling members 84 and 86 may be of any suitable construction but are preferably of quick connect and disconnect type enabling an operator to quickly close the conduit system between the lubricating station and the vehicle to be lubricated.

The air for supplying the pressure necessary to operate the pump may be contained in an air tank or reservoir 90 which communicates with the pump through a line 92 controlled by a valve 94. The valve 94 has two positions. In one position of the valve it seals off the tank and relieves the pressure in the pump cylinder 52, and in the other position it places the tank and pump cylinder in communication. Valve 94 may be controlled by a solenoid 96 which when energized moves valve 94 to admit air pressure to the pump cylinder and when deenergized moves the valve to relieve pressure in the pump cylinder.

Figure 3:
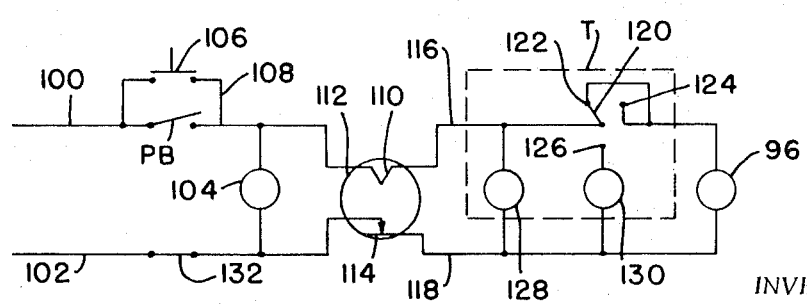
FIG. 3 is an electrical diagram illustrating one arrangement for operating the pump through a series of pressure surges.

Any suitable means may be provided to energize solenoid 96 and send a surge of lubricant from the pump under pressure through line 64 to the lubricant conduit system of the vehicle. Ordinarily the pressure surge will last for only a few seconds and in some instances it is desired to repeat the operation by sending several surges of lubricant through the system, each surge being separated by a period of relief of several seconds duration. While the operation of the pump clearly could be manually controlled by a manual opening and closing of the valve 94, FIG. 3 illustrates a system in which the operation of a manual button PB will cycle the system to cause the pump to send two surges of pressure through the system each of a desired duration and separated by periods of pressure relief. The electrical diagram includes the leads 100 and 102, pushbutton PB being in lead 100. A solenoid 104 across these leads has a normally open contact 106 in the bypass circuit 108. The lead 100 extends to a coil 110 in the time delay relay 112 which has the normally closed contact 114 connected to lead 102. Leads 116 and 118 from the coil 110 and contact 114 of time delay relay 112 extend to the solenoid 96 through the timer T. The timer T may be of any suitable construction, but is here shown as including the stepping switch arm 120 which is shown in engagement with contact 122 and which rotates across contacts 124 and 126 in response to the deenergization of relay 128 across leads 116 and 118. Solenoid 130 extends from contact 126 to lead 118, and has a normally closed contact 132 in lead 102.

Figure 4:
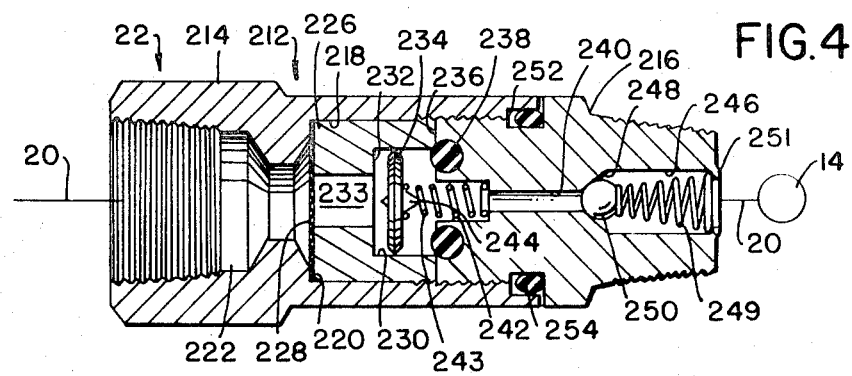
FIG. 4 is a sectional view of a metering device.

The metering devices 22 may be of any suitable construction and preferably take the form of the device shown in FIG. 4. This device is fully disclosed in a copending application of Roy B. Smith filed Aug. 4, 1967 and assigned to the assignee of this application.

The metering device 22 comprises an elongated body 212 having an elongated tubular inlet body part 214 and an elongated tubular outlet body part 216. The inlet body part 214 has an elongated coaxial cylindrical cavity 218 extending from a point intermediate its length to its outer end. The outer end portion of this cavity is internally threaded and threadedly receives the inner end portion of the outer body part 216. The inner end portion of the cavity 218 is of smooth uniform circular cross section. The inner end of the cavity 218 is defined by a transverse wall 220 disposed at right angles to the longitudinal central axis of the body, and an oil inlet passage 222 extends from the inner end of the inlet body part to the cavity 218 through wall 220. This oil inlet passage is internally threaded for connection to a coupling with a branch line 20.

The cylindrical metering chamber member 226 fits in the cavity 218. This member has a side wall of uniform circular cross section in close fitting contact with the cylindrical wall of the cavity 218, and the inner end of the member 226 is disposed adjacent to the transverse wall or shoulder 220 in the body part 214. A screen 228 is clamped between the inner end of the member 226 and the transverse wall 20. The screen may for example be a 200-mesh screen and is designed to strain or exclude impurities from oil entering the metering device.

The member 226 has within it a coaxial chamber 230 of uniform circular cross section which is open at the outer end. The inner end of the chamber 230 is defined by a transverse wall 232 at right angles to the axis of the body and intermediate the ends of the member 226. A central passage 233 in the member 226 places the chamber 230 in communication with the oil inlet passage 222.

A circular valve 234 is disposed within the chamber 230. The valve 234 is in the form of a flat disk, and is only slightly smaller in diameter than the chamber 230 to provide a peripheral clearance. The difference in diameter between the valve 234 and the chamber 230 is preferably about 0.002 inches, providing a clearance of 0.001 inches. The valve 234 is capable of moving axially within the chamber 230, although when the valve moves slowly oil will bypass the valve through the slight clearance around its periphery. As shown, the valve is preferably peripherally feathered, that is reduced to a relatively sharp edge so as to preclude the accumulation of grit or foreign particles and also to prevent the valve from becoming cocked.

The inner end of the outer body part 216 is defined by a transverse wall 236 at right angles to the central axis of the body, this wall abutting the outer end of the chamber member 226 and pressing it inwardly toward the transverse wall 220 of the inner body part 214. The wall 236 defines the outer end of the chamber 230.

The inner end of the outer body part 216 has an annular recess in the wall 236 in which an O-ring 238 is disposed. During movement of the valve 34 to the right or in a pumping direction the valve comes in sealing contact with O-ring 238 to complete the pumping stroke.

The outer body part 216 has a central oil outlet passage 240. The inner end of this passage is enlarged as indicated at 242, and one end of a compression coil spring 243 is received in this enlarged portion 242 of the outlet passage. The opposite end of the compression coil spring bears against the valve member 234, urging it to the left in FIG. 1 to retract it. The valve member has a central axial cone-shaped part 244 extending into the spring 243 to center it. The outer end portion of the oil outlet passage 240 is also enlarged as shown at 246, and at the inner end has a frustoconical valve seat 248. A check valve in the form of the ball 250 is disposed in the enlargement 246 and is adapted to seat against the tapered seat 248 to close the outlet passage. A compression coil spring 249 has one end bearing against the ball valve 250 and its outer end engages an inturned flange 251 surrounding the enlargement 246 of the passage. The spring 249 urges the ball 250 toward its seated position illustrated in the drawings.

The outer end of the inner body part 214 is internally enlarged and the adjacent inner end of the outer body part 216 is externally reduced to provide an annular space 252 in which an O-ring seal 254 is disposed for sealing the inner and outer body parts against the escape of lubricant.

The branch line 20 leads from the oil outlet passage 240 to the point to be lubricated.

In the operation of the metering device 22, it will be understood that between pressure surges, that is when the pump 28 is not operating, the pressures on opposite sides of the valve 234 will be substantially equal due to the fact that the oil in chamber 230 is capable of bypassing the valve 234 across the peripheral clearance. The spring 243 will force the valve 234 to the left against the inner transverse wall 232.

The return spring 243 needs to be only strong enough to retract the valve 234 against the end wall 232, it being understood that the pressures on opposite sides of the valve 234 will at this time be substantially equal although movement of the valve in the chamber may develop a slight differential pressure as oil is bypassed from one side of the valve to the other. The spring 249 however, should be strong enough to hold the ball valve 250 closed against whatever residual pressure there may be in the system. Otherwise oil might bleed or syphon through the metering valve to the point to be lubricated between surges of pressure from the pump. Accordingly, it may be desirable to have a spring 249 which is capable of closing the ball valve 250 against a residual pressure for example of 100 p.s.i. in the metering device.

During those intervals when the pump is operated a surge of pressure will build up in the oil inlet passage 222. There may for example be a sudden or abrupt surge of pressure on the order of 1,000 p.s.i. The result will be to cause a rapid movement of the valve 234 to the right to pump a charge of oil through the outlet passage and across the ball 250 to the bearing or other point to be lubricated. The volume of oil thus pumped will be substantially equal to the volume of the chamber 230 on the right side of the valve 234 when retracted because the valve will move to the right through a pumping stroke until it contacts the O-ring 238. The surge of pressure is sufficiently abrupt and the movement of the valve 234 sufficiently rapid that virtually no lubricant will bypass the valve but rather will be pumped out through the outlet passage 240 to the point 14 to be lubricated.

The duration of the pressure surge should be sufficient to permit the lubricant to reach the point to be lubricated which may be located a substantial distance from the metering device.

The valve body parts 214 and 216 may be readily unthreaded and separated from one another making it possible to replace either or both the chamber-forming member 226 and the valve 234. Obviously by substituting a chamber-forming member having a chamber of a different dimension, for example longer or shorter, or substituting a valve which is thicker or thinner than the one shown, or by substituting a chamber-forming member and a valve both having different dimensions, the volume of the charge of lubricant pumped on each stroke of the valve can be varied.

In the operation of the system, a vehicle is positioned alongside the station 10 and the coupling members 84 and 86 joined. A lubricating cycle may then be initiated by the manual closing of pushbutton PB. Solenoid 104 is thus energized closing contact 106 and sealing in the circuit so that the pushbutton may be released and allowed to open. The time delay relay 112 is energized and solenoid 96 is energized through engagement of timer switch arm 120 with contact 122. Energization of solenoid 96 shifts valve 94 and causes air pressure to be admitted to cylinder 52 of pump 28 resulting in the advance of the pump piston to the position shown in FIG. 2 and producing a surge of pressure to the metering devices 22. The pistons of the metering devices will accordingly advance and lubricate each associated point to be lubricated with a predetermined quantity of lubricant. Timer solenoid 128 is also energized at this time.

After a predetermined time interval, the coil 110 of time delay relay 112 effects opening of contact 114 deenergizing solenoid 96 and thus shifting valve 94 to a position exhausting the pump cylinder permitting the pump piston to return to its retracted position and relieve the pressure in the conduits 64, 16, 18 and 20 leading to the metering devices 22. Simultaneously the timer solenoid 128 is deenergized resulting in the movement of the timer switch arm 120 clockwise into engagement with contact 124. Any suitable means may be provided for effecting the movement of the switch arm 120 in response to the deenergization of the solenoid 128.

After an interval of time determined by the characteristics of the time delay relay 112, the contact 114 thereof closes to again energize solenoid 96, shifting the valve 94 back to a position admitting air pressure to pump 28 and causing its piston 55 to apply a second surge of pressure in the lubricating system. Simultaneously the timer solenoid 128 is energized.

After a further time interval, the time delay relay contact 114 again opens to deenergize solenoid 96, shifting valve 94 to relieve the pressure in pump 28. The pump piston retracts and thereby relieves the pressure in the lubricant system. At the same time timer solenoid 128 is deenergized causing timer switch arm 120 to be stepped clockwise into engagement with contact 126. Thereafter when the relay contact 114 closes, relay 130 is energized to open its normally closed contact 132 to open the circuit and end the cycle.

It will be apparent from the foregoing that an entire fleet of vehicles may be lubricated from a single lubricating station or island.

What I claim as my invention is:

1. A lubricating system for a fleet of vehicles adapted to lubricate a plurality of points on each of the vehicles comprising a single lubricating station, lubricant-pumping means at said lubricating station, first lubricant conduit means extending from said pumping means, second lubricant conduit means on each vehicle having branch lines respectively leading to each of the points to be lubricated, releasable means for connecting said first lubricant conduit means to said second lubricant conduit means on any one of such vehicles, means for momentarily actuating and then deactuating said pumping means, and a separate metering means in each of said branch lines of each said second lubricant conduit means, whereby when said second lubricant conduit means of any of such vehicles is connected to said first lubricant conduit means said metering means thereof will deliver an exact metered amount of lubricant to each of the plurality of points to be lubricated upon each actuation of said pumping means, each said metering means comprising a cylinder and piston therein dimensioned to deliver a predetermined amount of lubricant upon each stroke of the piston.

2. A lubricating system for a fleet of vehicles adapted to lubricate a plurality of points on each of the vehicles comprising a single lubricating station, lubricant-pumping means at said lubricating station, first lubricant conduit means extending from said pumping means, second lubricant conduit means on each vehicle having branch lines respectively leading to each of the points to be lubricated, releasable means for connecting said first lubricant conduit means to said second lubricant conduit means on any one of such vehicles, timer means for alternately actuating and deactuating said pumping means at timed intervals when rendered operative, means for rendering said timer means operative, and a separate metering means in each of said branch lines of each said second lubricant conduit means, each said metering means being dimensioned to deliver a predetermined amount of lubricant upon each actuation of said pumping means, whereby when said second lubricant conduit means of any of such vehicles is connected to said first lubricant conduit means said metering means thereof will deliver an exact metered amount of lubricant to each of the plurality of points to be lubricated upon each actuation of said pumping means.

* * * * *